July 13, 1943.  E. H. KOCHER  2,324,402
LUBRICATION
Filed July 3, 1940
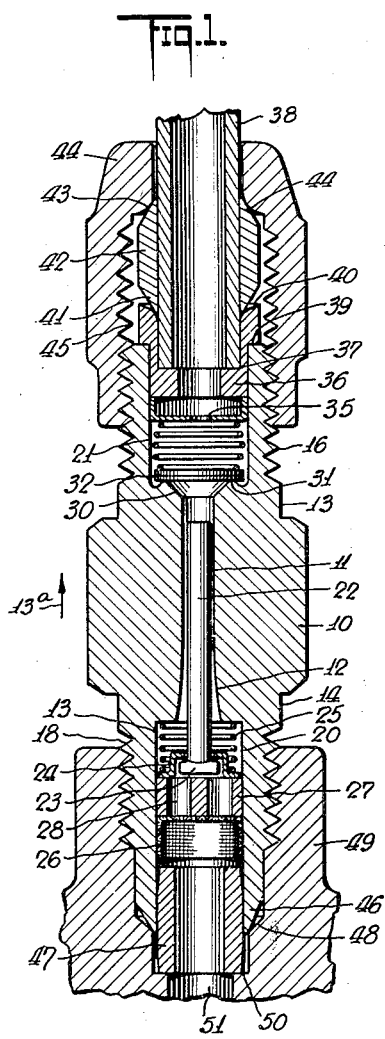
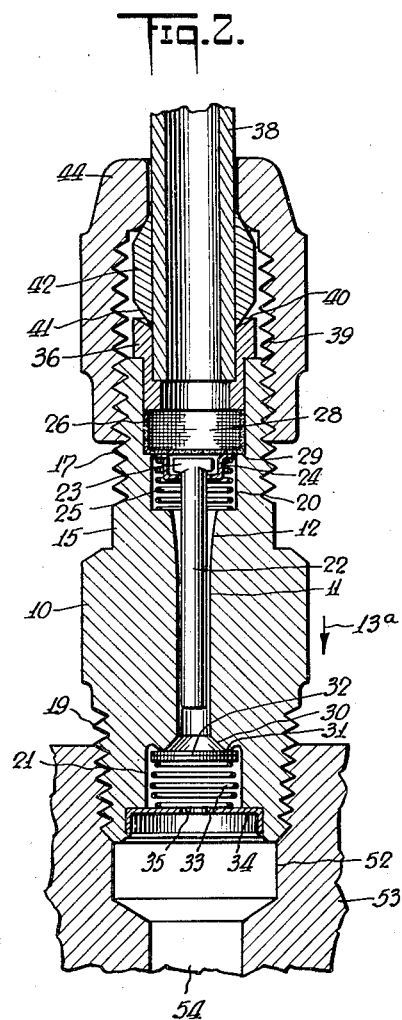
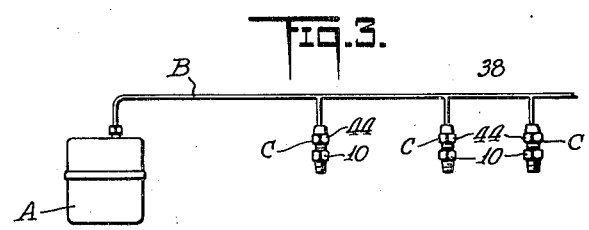
INVENTOR
Edward H. Kocher
BY Dean Fairbanks
ATTORNEYS Patented July 13, 1943

2,324,402

UNITED STATES PATENT OFFICE 2,324,402

LUBRICATION

Edward H. Kocher, Boonton, N. J., assignor to Auto Research Corporation, a corporation of Delaware Application July 3, 1940, Serial No. 343,727

8 Claims. (Cl. 137—69)

The present invention relates to a lubrication system and it particularly relates to centralized lubricating systems.

In centralized lubricating systems where it is desired to supply relatively minute, yet accurately proportioned quantities of lubricant to a plurality of spaced and distributed bearings of a mechanism such as an automotive chassis, a machine tool, a printing press, and various other types of automatic machinery, it has been found satisfactory to utilize flow metering outlet fittings or high restriction flow metering outlet fittings which will afford a restricting or obstructing effect tremendously higher—say 10 to 100 times higher than that afforded by the tubing system or the bearings themselves, with the result that these outlet fittings will accurately proportion the charge of lubricant injected into the piping system among the various bearings of said piping system.

In one form of a flow metering fitting, for example of the type shown in U. S. Patents 1,632,771 and 1,632,772, the high restriction metering or proportioning fitting is provided with a body having a central accurately proportioned bore with a pin substantially completely filling said bore and forming a narrow annular crevice through which the oil must pass in its movement from the tubing into the bearing.

In the preferred form of device, this fitting is also provided with a check valve to prevent reverse flow of lubricant, which check valve may be spring seated and with an inlet strainer or filter to collect dirt and dust and eliminate clogging of the annular crevice.

It is among the objects of the present invention to provide an improved device of the character above described in which there will be greater assurance that fine dirt or suspended solid particles carried by the oil or lubricant will not readily settle in or clog said narrow annular restriction or crevice, and it is among the objects of the present invention to provide an improved flow metering outlet fitting of the character above described in which any clogging tendencies, even with relatively dirty oil, will be eliminated or substantially decreased.

Other and further objects and advantages will also appear from the more detailed description given below, it being understood however, that this more detailed description is given by way of illustration and explanation only and not by way of limitation, since various changes therein may be made by those skilled in the art without departing from the scope and sphere of the present invention.

In accomplishing the above objects it has been found most satisfactory according to one embodiment of the present invention to provide a flow metering fitting and a body with a centrally accurately dimensioned bore, which bore will be substantially completely filled by a pin to form a narrow annular crevice of the order of one or several thousandths of an inch having a restricting effect varying from 10 to 100 times that of the longest length of tubing or the tightest bearing of the mechanism being lubricated.

The body of the device is also provided with an inlet and outlet socket, the former carrying a strainer and the latter carrying a check valve which is preferably spring seated.

Depending upon whether the fitting is to be mounted upon a bearing with its inlet end connected to a tubing system, or mounted in the junction with its outlet end connected to a tail pipe system leading to the bearings to be lubricated, the ends of the fitting may be provided with threaded connections to receive tubing coupling devices.

In the preferred form of the present invention in one of the sockets, and preferably in the inlet recess, there is provided a means for causing positive movement of the pin of the flow metering device, so that pressure variations or the pressure drop against the fitting will cause a positive movement of the pin.

In one preferred form the pin is provided with an enlargement which is received in a cup, which cup in turn is provided with a biasing spring to press it in one direction, normally toward the inlet of the fitting.

There will be a sufficient pressure drop across the pin when pressure is applied to cause the pin to move in an opposite direction to that in which it is biased by the spring.

In the accompanying drawing in which are shown one or more of the various possible embodiments of the several features of the invention, Fig. 1 is a longitudinal sectional view of one type of flow metering fitting which is designed to be mounted upon a junction and to be connected to a bearing by means of a tail pipe system, Fig. 2 is a longitudinal sectional view of an alternative type of fitting which is designed to be connected to the outlet of a tubing system and to be mounted upon a bearing, Fig. 3 is a diagrammatic view illustrating the centralized system upon a smaller scale than the flow metering fittings shown in Figs. 1 and 2.

Referring to Figs. 1 and 2, the flow metering fittings are provided with bodies 10, which may be formed from round or hexagon stock having central bores 11 with flaring inlet ends 12. The lubricant is designed to flow through these fittings in the direction indicated by the arrows 13a.

The fittings 10 are provided with the reduced end portions 13, 14 and 15 which may receive the machine threads 16, 17 and 18 or the pipe threads 19. The inlet ends of the fittings 10 are provided with the sockets 20 and the outlet ends are provided with the sockets 21.

The pins 22 extend into and substantially completely fill the bores 11 and they also extend into the bottom portions of the inlet sockets 20 where they have the enlarged or flattened end portions 23 received in the cups 24, said cups having flanges against which react the coil springs 25. The other end of the coil springs 25 react against the bottom of the sockets 20.

The outer portions of the sockets 20 receive the cup-shaped strainers 26, these cup-shaped strainers being held in position by the insert 27, having the flow openings 28 in Fig. 1, or by the shoulder 29 in Fig. 2.

The outlet socket is provided with the conical portion 30, at the end of which is formed the valve seat 31, the valve 32 consisting of an oil silk or similar facing with a metal back.

The valves 32, as shown, are provided with the springs 33 pressing them against the seats 31 and with the retainer members 34. The retainer members 34 are provided with outlet flow openings 35 and other openings may be provided around the periphery thereof, if desired.

In Figs. 1 and 2, the valve retainer 34 and the strainer 26, respectively, are held in position in the end sockets by the hard metal sleeve 36, for example made of steel, which has a shoulder 37 receiving the end of the tube 38 and in turn a shoulder 39 to contact the end of the fitting body 10.

The end of the sleeve is provided with a conical recess 40 which receives the inside end 41 of the double tapered coupling sleeve 42, said double tapered coupling sleeve 42 fitting upon the pipe tubing ends 38.

The tapered outside ends 44 of the sleeves 42 fit into the bevelled portions 43 on the inside edges of the coupling nuts 44, which coupling nuts 44 are threaded at 45 to engage the threads 16 and 17 respectively.

The couplings as shown in the coupling connections of Figs. 1 and 2 may be of the form as more fully shown and described in connection with application Serial No. 727,719, filed March 26, 1934, now Patent No. 2,182,811, issued December 12, 1939, or British Patent No. 448,792.

In reference to Fig. 1, the inlet end of the fitting 10 may have a conical nose 46, within which may be inserted the sleeve 47, said conical nose abutting the conical shelf 48 in the mounting or junction structure 49 and said sleeve 47 abutting the shoulder 50. The lubricant may be received under pressure from the bore 51 in the mounting structure 49.

In the device in Fig. 2, the pipe thread 19 is screwed into the threaded socket 52 in the bearing structure 53 and feeds lubricant into the bore 54 leading to the bearing to be lubricated.

In Fig. 3 is shown a diagrammatic view showing a central pump A feeding a tubing system B, having a plurality of flow metering outlets C.

The system, as shown in Fig. 3, may be connected to lubricate an automobile chassis, a machine tool, a printing press, or any other type of automatic machine.

In operation the lubricant may be fed through the passageway 51 in Fig. 1 or through the tube 38 in Fig. 2 or through the piping system B in Fig. 3 under a pressure which may vary say from ½ pound up to possibly as high as 60 or more pounds.

With the continuous system the lubricant pressure will be applied throughout the operation of the machine, while with an intermittent system the lubricant may be applied at intervals of an hour or two hours, as the case may be.

A convenient type of continuous pump which may be employed is that shown in applications Serial No. 468,790, filed July 18, 1930, now Patent No. 2,145,854 issued February 7, 1939, and Serial No. 745,187, filed September 24, 1934, while a convenient type of intermittent pump is that shown in application Serial No. 615,616, filed June 6, 1932, now Patent No. 2,024,233, issued December 17, 1935, or in application Serial No. 1,985, filed January 16, 1935, now Patent No. 2,161,821, issued June 13, 1939.

In each case, as soon as the pressure is applied and flow commences, the pin will be moved in the direction 13 farther into the hole or bore 11. At the same time, it will not afford sufficient obstruction to overcome or to effect the proportioning effect of the pin 22 in bore 11 combination.

As soon as the lubricant pressure is released and flow ceases, the pin will be returned by the spring 25 acting on the cup 24. This reciprocating movement of the pin, with each alteration of flow or pressure, will result in a cleaning of the pin and decrease in any clogging tendencies of dirt or grime in the oil.

This effect is all the more enhanced by the tapering or gradual constriction of the bore 11, as indicated at 12 in Figs. 1 and 2.

Although many different sizes and proportions may be utilized, it has been found most satisfactory to have the flare 12 extend a distance varying from ⅛ to ⅓ of the length of the bore and to have the bore extend a length of ⅞ of an inch.

The diameter of the bore at its narrowest portion may be $\frac{1}{16}$ of an inch, while the diameter of the pin may be from 1 to 2 or 3 thousandths less.

The cup 24 may have an external diameter of $\frac{5}{32}$ of an inch and it should preferably have at least a sixty-fourth of an inch clearance in respect to the inlet socket 20.

It will be noted that the enlarged head 23 of the pin 22 is held in position in the depression of the cup 24 by the insert 27 in Fig. 1 and by the strainer 26 in Fig. 2.

The flow metering fitting, as shown in Figs. 1 and 2, may even be utilized with relatively dirty oil, such as engine oil, and with relatively loose strainers 26.

This invention, however, is not intended to be restricted to any particular construction or arrangement of parts, or to any particular method of operation or manner of use, or to any of the various details thereof, herein shown and described, as the same may be modified in various particulars or may be applied in many varied ways without departing from the spirit and scope of the claimed invention. The practical embodiments herein illustrated are described merely as showing some of the various features entering into the application of the invention.

What is claimed is:

1. For use in the outlets of a centralized lubricating installation having a central pump and reservoir and a branched conduit installation having a single inlet and a plurality of outlets to bearings to be lubricated; a high restriction flow metering device affording a tremendously greater obstructing effect to the flow of lubricant than the conduits or the bearings, said device consisting of a fitting with body having an inlet, an outlet and a central bore, a reciprocating pin fitting in and substantially completely filling said bore and leaving an annular crevice of one to several thousandths of an inch which causes said obstructing effect, said body having sockets positioned at said inlet and said outlet, said outlet socket having a spring-seated check valve and said inlet socket having a cup member for causing reciprocation of said pin upon application or removal of pressure through said inlet.

2. For use in the outlets of a centralized lubricating installation having a central pump and reservoir and a branched conduit installation having a single inlet and a plurality of outlets to bearings to be lubricated; a high restriction flow metering device affording a tremendously greater obstructing effect to the flow of lubricant than the conduits or the bearings, said device consisting of a fitting with body having an inlet, an outlet and a central bore, a reciprocating pin fitting in and substantially completely filling said bore and leaving an annular crevice of one to several thousandths of an inch which causes said obstructing effect, said bore being enlarged toward its inlet end and opening into an enlarged socket adjacent the inlet of said body, and a spring pressed cup member in said socket to cause said pin to reciprocate with application of pressure to said inlet.

3. As an element in a lubricating installation, a pipe fitting having a nipple to be applied to a bearing, said element having a spring-seated non-sticking valve therein having a flat facing to prevent escape of oil from the fitting when less than a predetermined low pressure is applied thereto and a member nearly fitting a part of the bore of said fitting to form a minute high resistance outlet in series with said valve and of resistance to flow higher than that due to said valve, and means to cause reciprocation of said member upon successive applications of pressure to said fitting through said installation.

4. As an element in a lubricating installation, a pipe fitting having a nipple adapted to be applied to a bearing, a spring-seated valve in said fitting to prevent escape of oil therefrom between pressure applications, said fitting including a resistance of flow retarding effect greater than that due to said valve, said resistance comprising a pin independent of said valve, within a portion of the bore of said fitting larger in diameter than said pin in the order of .001 to .007 inch, and a spring pressed cup member attached to the inlet end of said pin to cause said pin to reciprocate upon application of oil pressure thereto.

5. A flow restriction fitting having a longitudinal bore therein, a rigid pin loosely filling said bore, with a minute clearance offering a high resistance to flow, and a spring-seated relief valve in a corresponding socket at one end of said fitting and a spring pressed disc member connected to the inlet end of said pin to cause said pin to move in said bore upon relief of pressure upon said fitting and to permit said pin to move in said bore upon application of pressure to said fitting.

6. A flow restriction fitting having a longitudinal bore therein, a rigid pin loosely filling said bore with a minute clearance offering a high resistance to flow, and a cup shaped strainer fitting in a corresponding socket at the inlet end of said fitting, and a spring pressed disc element connected to the inlet end of said pin positioned between said strainer and said pin.

7. A flow restriction fitting having a longitudinal bore therein, a rigid pin loosely filling said bore with a minute clearance offering a high resistance to flow, a strainer cup in a corresponding socket at the inlet end of said fitting, spring-seated disk members in corresponding sockets at the ends of said fitting, and a disc member at the inlet end of the fitting being connected to said pin and the disc member at the outlet end of said fitting being devoid of connection to said pin and serving as an outlet check valve.

8. An outlet fitting for use in a pressure lubricating system, said fittings having means at an end for application thereof at the bearing and including coupling means at the opposite end for application thereto of the pipe extremity, each fitting having flow controlling means including a loosely fitting substantially rigid part lodged with small substantially invariant clearance in a straight bore longitudinally of said fitting, and affording a crevice of uniform resistance all around it, the space left in said bore by said rigid part determining the selected calibration of the fitting, a valve seat in said fitting, said flow controlling means including a self-aligning valve part, and a coil spring normally urging said valve part against said seat, to hinder loss of lubricant, and means connected to the inlet end of said fitting connected to said rigid part to cause said rigid part to reciprocate with application and relief of pressure from said system.

EDWARD H. KOCHER.